May 24, 1955 — L. F. HANSEN — 2,709,076
WEIGHT RECORDING AND CALCULATING APPARATUS
Filed Jan. 18, 1951 — 9 Sheets-Sheet 2
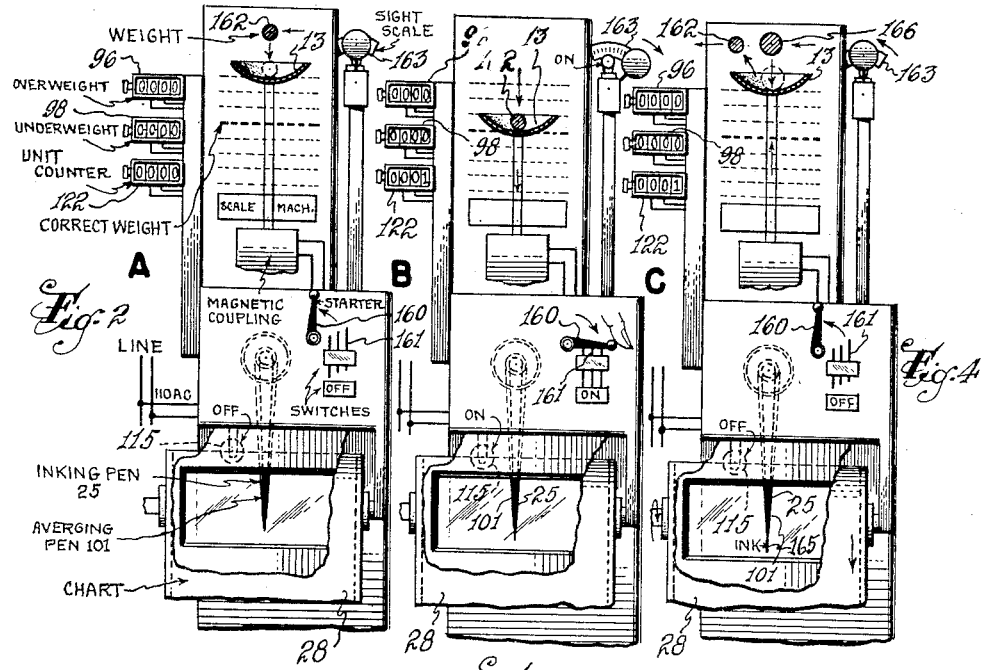
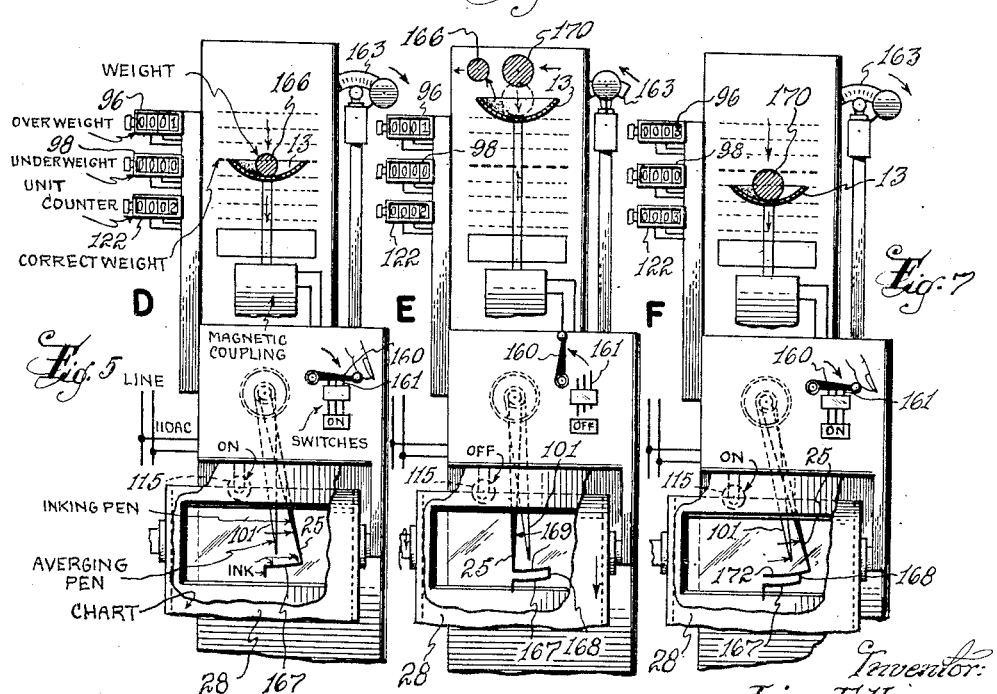

May 24, 1955
L. F. HANSEN
2,709,076
WEIGHT RECORDING AND CALCULATING APPARATUS
Filed Jan. 18, 1951
9 Sheets-Sheet 3
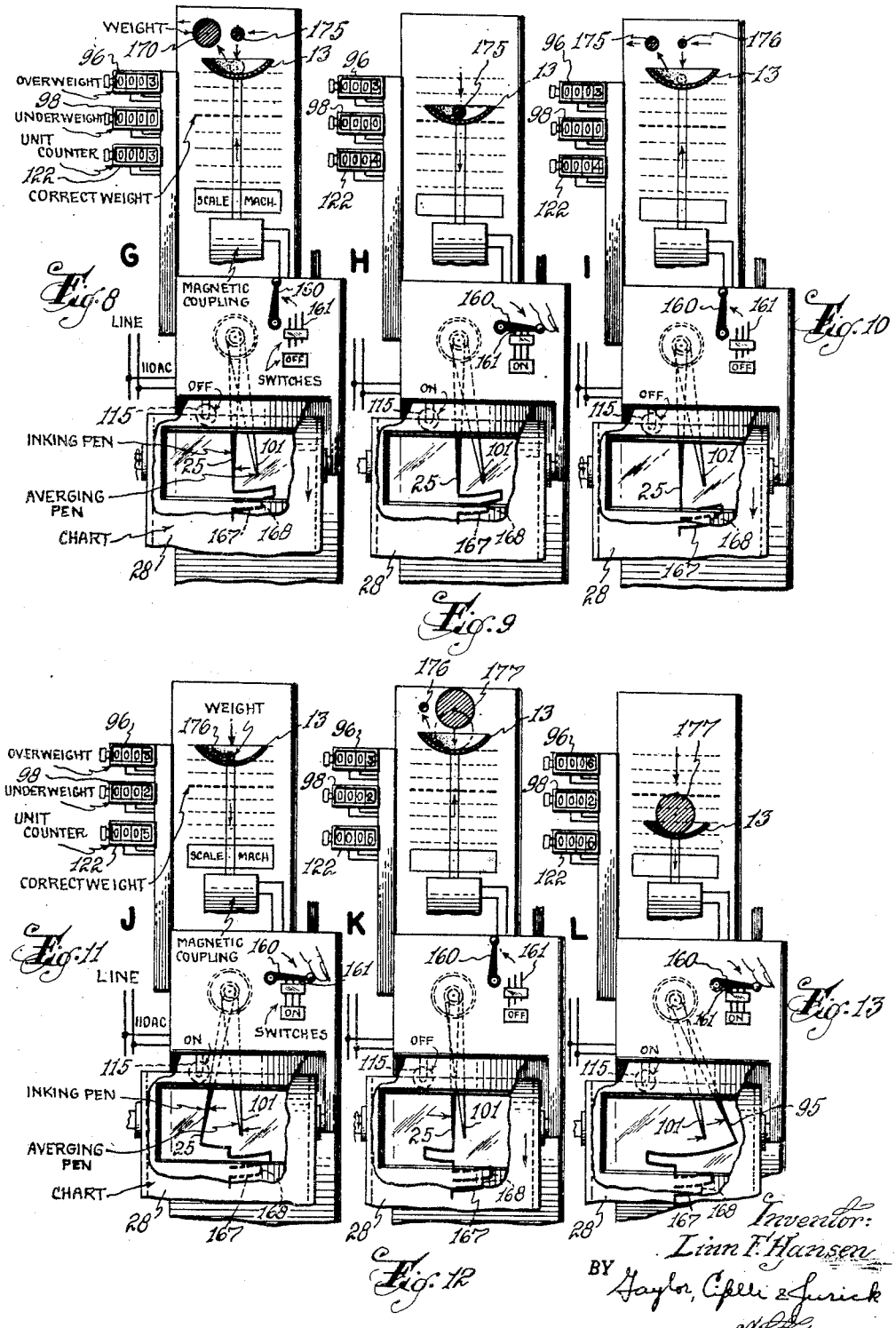

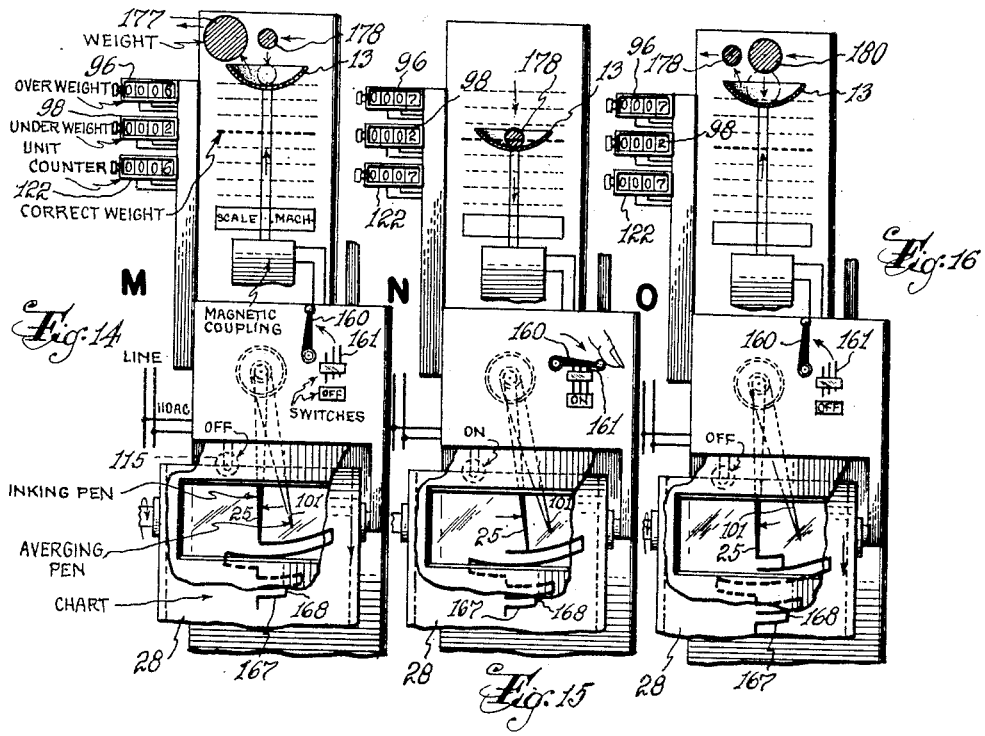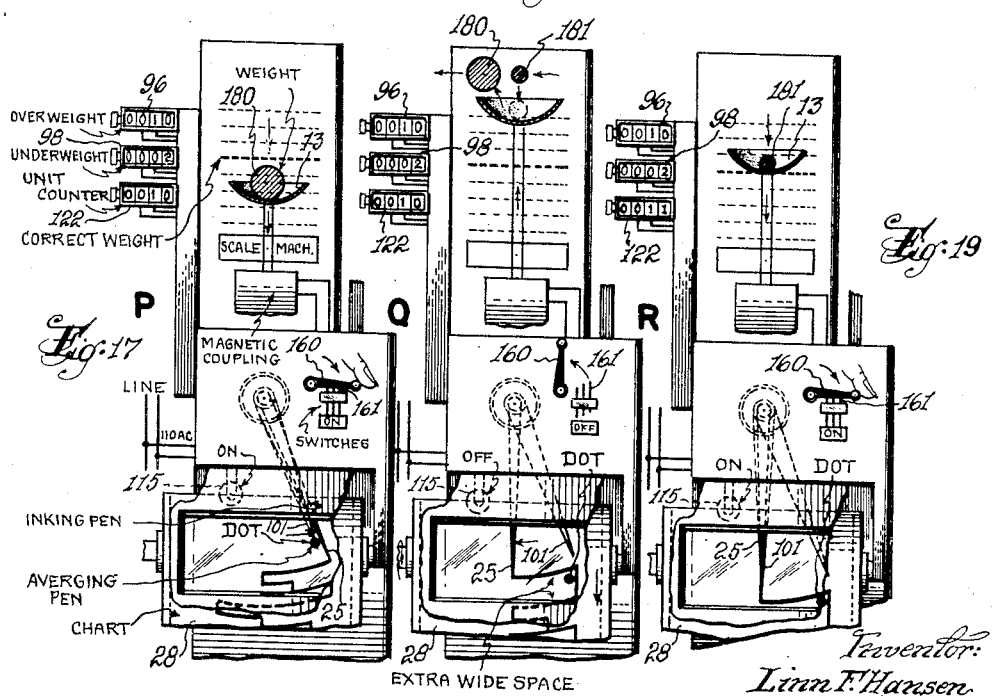

May 24, 1955    L. F. HANSEN    2,709,076
WEIGHT RECORDING AND CALCULATING APPARATUS
Filed Jan. 18, 1951    9 Sheets-Sheet 5

Inventor:
Linn F. Hansen
BY Taylor, Apper & Jurick
Attorneys

May 24, 1955  L. F. HANSEN  2,709,076
WEIGHT RECORDING AND CALCULATING APPARATUS
Filed Jan. 18, 1951  9 Sheets-Sheet 6
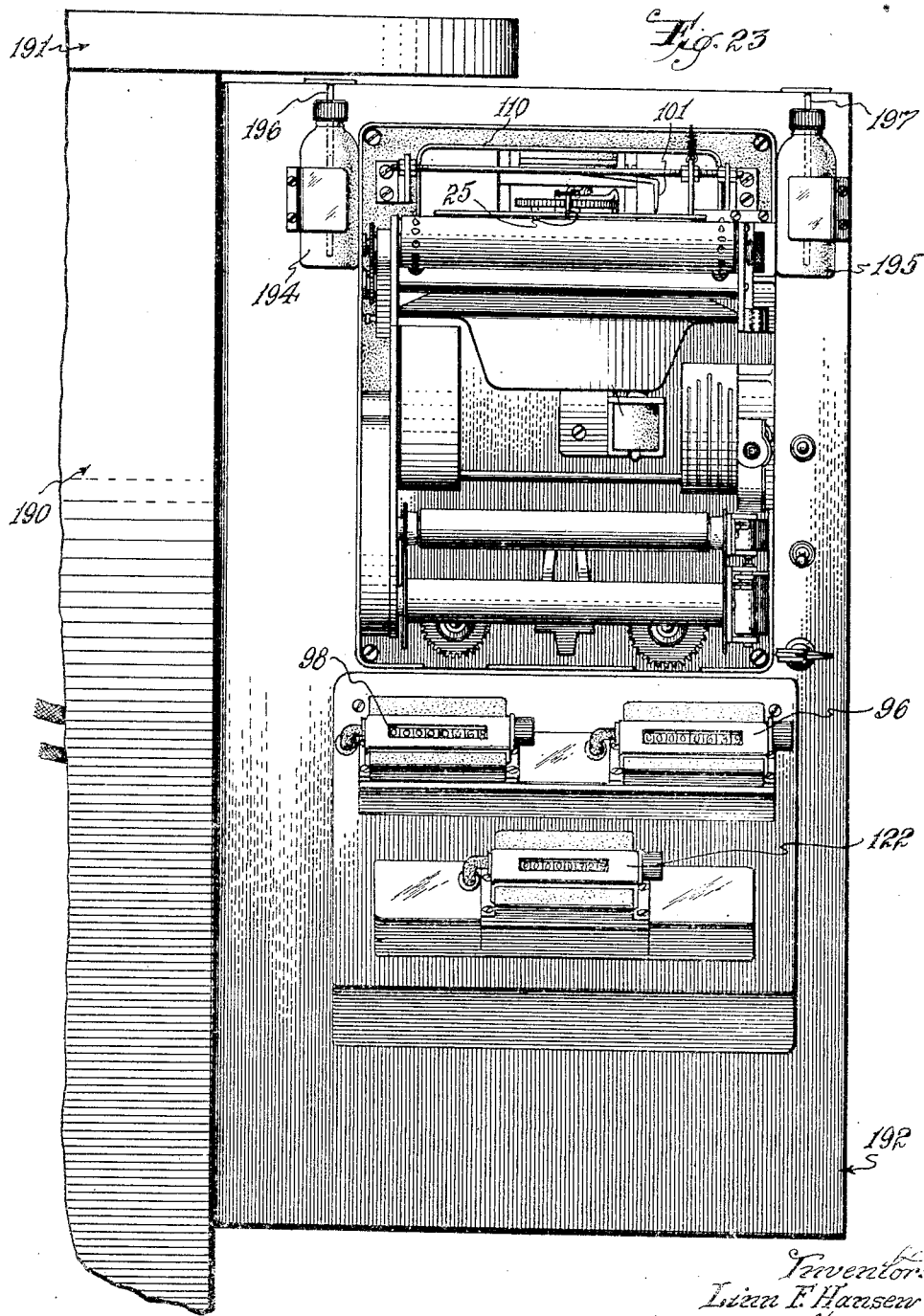

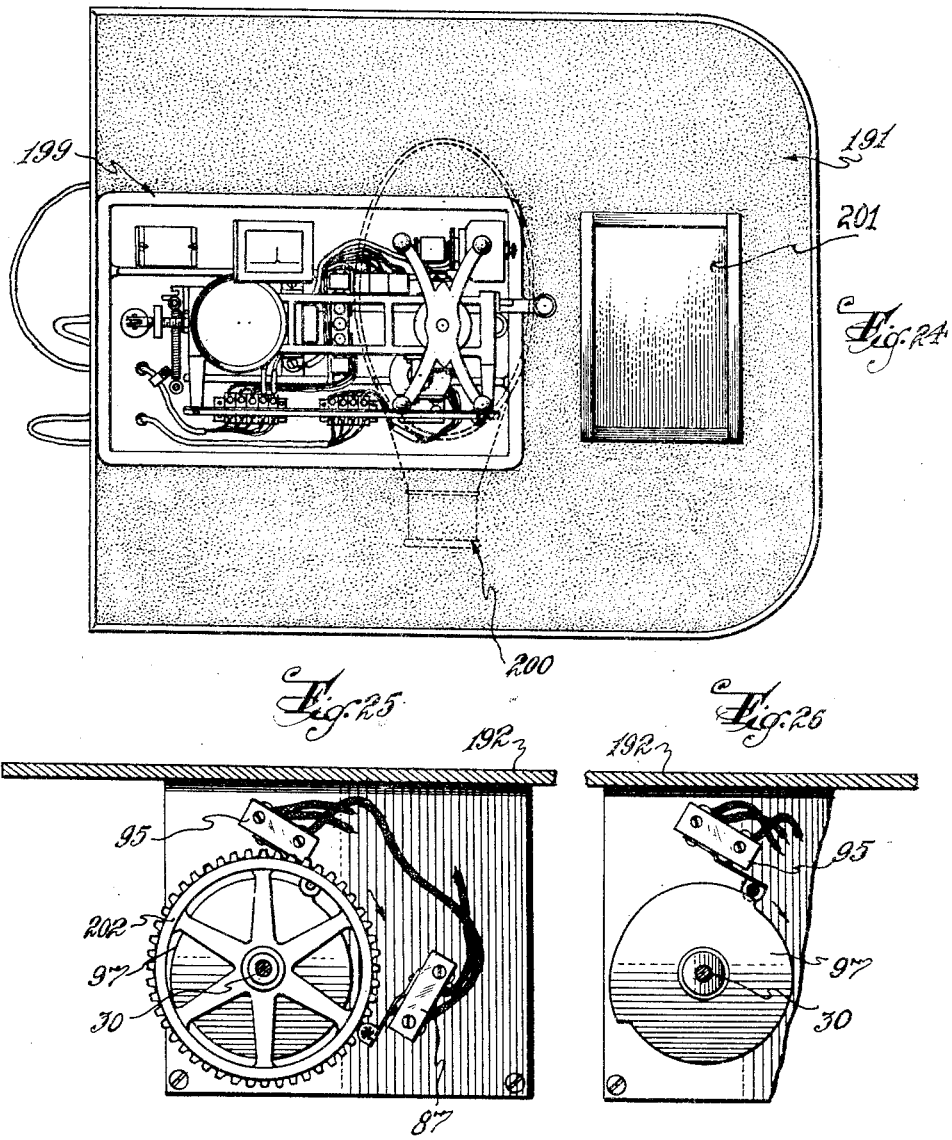

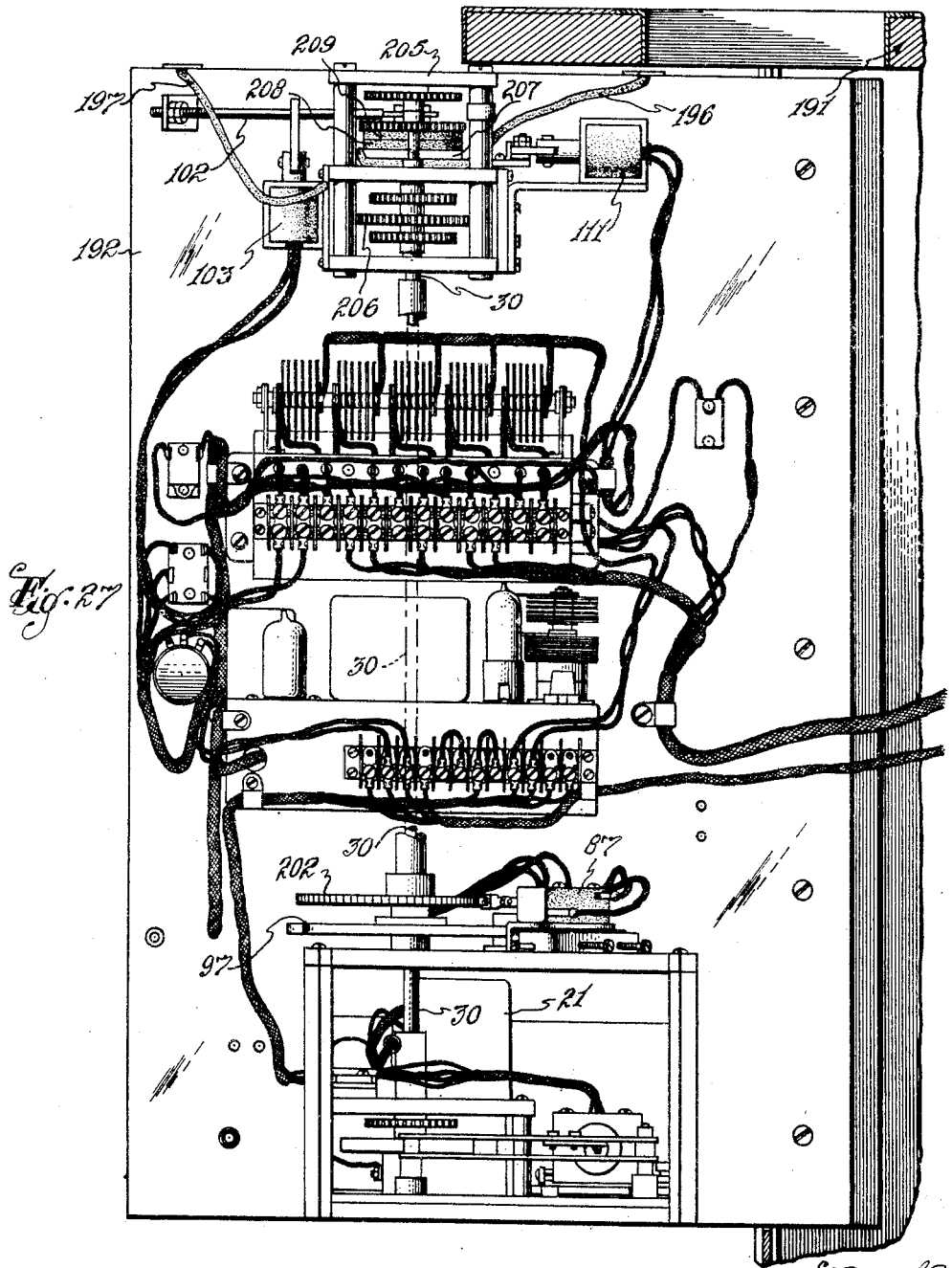

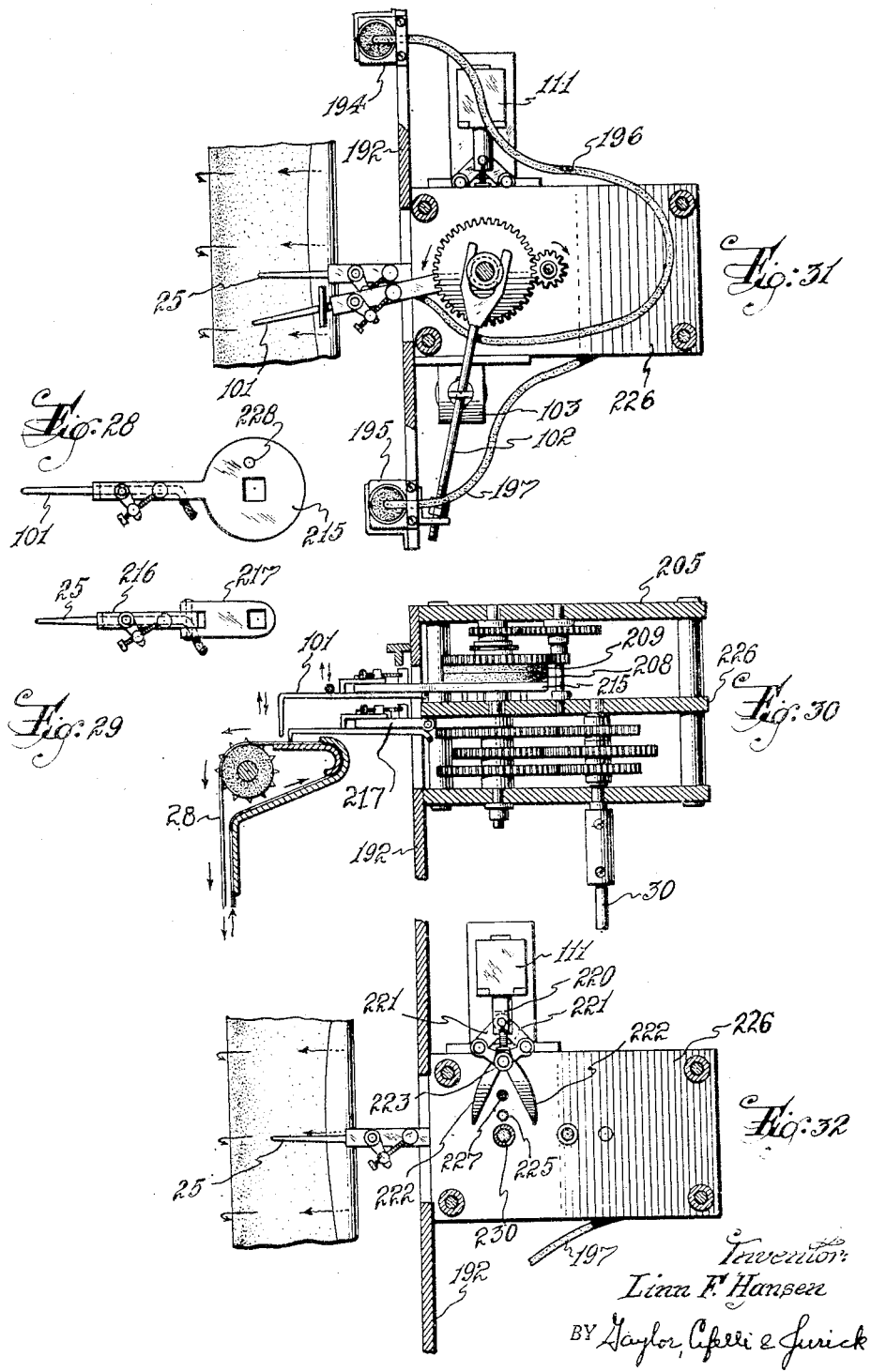

United States Patent Office 2,709,076
Patented May 24, 1955

2,709,076

WEIGHT RECORDING AND CALCULATING APPARATUS

Linn F. Hansen, Roseland, N. J.

Application January 18, 1951, Serial No. 206,584

18 Claims. (Cl. 265—6)

This invention relates to weight recording and calculating apparatus for determining the exact deviation, from normal, of an article and more particularly to novel apparatus of this type adapted to provide a visual count and/or a permanent record of such weight deviations and an automatic averaging of the cumulative weight deviations of a predetermined number of units weight-tested.

The weight checking of packaged products, such as coffee, salt, sugar, candies, drugs, etc., is of particular importance to the manufacturer. Such packages are marked with a stated weight. If the actual content weight exceeds the stated value the manufacturer stands to suffer substantial monetary loss and, on the other hand, underweight packages are likely to cause trouble from the consumers and/or Government inspectors.

In accordance with present practice, sample packages are taken from the packaging tables or from the conveyor lines and each such sample is weighed on a precision scale. Written records are made of the precise weights and the average weight deviation for a given number of samples is determined mathematically, which procedure is time consuming and subject to human errors. Equally important, the calculated average deviation figure is not available until a later time, in most cases the next day, by which time it is too late to make corrective adjustments in the packaging machinery.

My invention provides apparatus which is positive and rapid in operation and which provides essential visual and written records for maintaining uniformity of product weight with a minimum possibility of error. The apparatus is entirely automatic in operation once the operator places the test package upon the weighing scale. The device may be set to provide weight deviations above or below and predetermined normal value. Thus, if the device is set for use with articles having a stated weight of, say, 16 ounces, the placement of a sample upon the weighing scale will provide:

1. A visual indication of the actual article weight relative to the normal, 16 ounces;
2. A registered count of the overweight or underweight in ounces;
3. A written record of the actual weight deviation of the article;
4. A continuous, visual indication of the cumulative average weight deviation of the previous units tested; and
5. A periodic, automatic, written record of the average weight deviation of a predetermined number of samples weight-tested.

All the above information is provided by automatic apparatus having a time cycle of operations of less than 10 seconds. The apparatus is of the self-recycling type by which is meant that all essential components return to a fixed, initial position upon completion of the normal operating cycle or upon interruption of such normal operating cycle. Specifically, if the operator prematurely removes the sample article being weight-tested, the apparatus returns to the initial starting position ready to function properly throughout the next test run.

An object of this invention is the provision of automatic apparatus for providing visual and written records of the weight deviation of an article from a predetermined normal weight.

An object of this invention is the provision of apparatus providing a continuous, visual indication of the cumulative average weight deviation, from normal, of the individual articles previously weight-tested and a permanent record of such average after a predetermined number of articles have been so tested.

An object of this invention is the provision of automatic apparatus for establishing the weight deviation of a sample from a predetermined normal weight, such apparatus comprising a weighing scale having a beam assuming a substantially horizontal position when an article placed thereon is of normal weight, a servo mechanism having a transmitter actuated by the deflection of the scale beam, a recorder having a pen normally in contact with a chart, means controlled by the servo mechanism for deflecting the recorder pen in accordance with the deflection of the scale beam, an electro-magnetic counter, means causing the counter to register counts corresponding to the extent of the deflection of the scale beam, means moving the chart a fixed distance when the pen has been deflected to its maximum position, and means indicating the completion of a weighing cycle begun when an article is placed upon the weighing scale.

An object of this invention is the provision of automatic apparatus of the type providing a written record of the precise weight deviation of an article from normal weight and including means for providing a true average of the weight deviations of a predetermined number of articles weighed.

An object of this invention is the provision of automatic apparatus of the type providing a written record of the precise weight deviation of an article from normal weight and including an averaging pen spaced from a recorder chart, means cumulatively deflecting the averaging pen in accordance with the weight deviations of articles weight-tested, means causing the pen to make a record on the chart after a predetermined number of articles have been weighed, and means returning the pen to an initial starting position after such predetermined number of articles have been tested.

An object of this invention is the provision of automatic apparatus for providing a record of the precise weight deviation of an article from normal weight and including an averaging pen, an electro-magnetic clutch and means causing said clutch to connect the said pen to a driving mechanism only during a predetermined portion of the weighing cycle.

An object of this invention is the provision of apparatus for recording the precise weight deviation of an article from normal weight comprising a weighing scale adapted to receive an article to be weight-tested; a recorder having an inking pen normally in contact with a chart and an averaging pen spaced from the chart, said chart having graduations to either side of a center, zero position and said pens initially aligned with such zero chart position; individual gearing mechanisms for deflecting each of said pens; a main shaft driving said gearing mechanisms; a motor connected to said main shaft; a servo mechanism having a transmitter actuated by the position of the beam of the weighing scale and providing power to said motor, whereby the main shaft rotates an angular extent related to the deflection of the weighing-scale beam; means rebalancing the servo mechanism upon such rotation of the main shaft; means advancing the recorder chart at this point in the operating cycle; automatic means causing the motor to return the main shaft to its original position after the recorder chart has been advanced; and means preventing the return of the averaging pen during the return movement of the main shaft.

An object of this invention is the provision of apparatus for indicating and recording the precise weight deviation of an article from normal weight, said apparatus comprising a weighing scale having a beam disposed in a substantially horizontal position when the article placed thereon is of normal weight; a servo mechanism that is balanced when the said article is of normal weight and unbalanced in direction and magnitude when the article deviates from such normal weight; a main shaft rotatable by a motor when the servo mechanism is unbalanced; a recorder having a zero-center chart; an inking pen in contact with the chart and initially aligned with the zero chart position; an averaging pen spaced from the chart and initially aligned with the zero chart position; means deflecting the inking pen with forward and reverse rotation of the main shaft; means deflecting the averaging pen during forward rotation only of the main shaft; an electromagnetic counter registering one count each time an article is weight-tested; an overweight and an underweight counter; means controlled by the direction of rotation of the main shaft to energize one or the other of the said overweight and underweight counters, and means controlled by the extent of said shaft rotation for actuating the last mentioned counters a number of counts corresponding to the extent of deviation of the article from normal weight.

An object of this invention is the provision of an automatic device of the type herein described.

These and other objects and advantages will be apparent from the following description when taken with the accompanying drawings illustrating a specific embodiment of the invention. It will be understood the drawings are for purposes of illustration and are not to be construed as defining the scope or limits of the invention, reference being had for the latter purpose to the appended claims.

In the drawings wherein like reference characters refer to like parts in the several views:

Figure 1 is a diagrammatic representation showing all the necessary components that make up my device, together with their co-acting positions and a schematic electrical circuit diagram;

Figures 2 to 19, inclusive, represent the functions performed by the device throughout a plurality of weighing cycles;

Figure 23 illustrates the front panel of the device that carries the recording mechanism and electro-magnetic counters;

Figure 24 illustrates the top of the cabinet carrying the weighing scale;

Figures 25 and 26 are plan views showing certain gears and switches that control the proper actuation of the electro-magnetic counters;

Figure 27 is a rear view of the main panel shown in Figure 23;

Figures 28 and 29 are plan views showing the mounting arrangements of the averaging and inking pens, respectively;

Figure 30 is a side view of a housing carrying the gear trains associated with the averaging and inking pens;

Figure 31 is a plan view of the Figure 30 mechanism but with parts removed to show the crank arm that operates the clutch controlling movement of the averaging pen; and Figure 32 is similar to Figure 31 but with additional parts removed to show the construction of the mechanism for resetting the averaging pen to its zero position after a selected number of weighing cycles have been completed.

Figure 1:
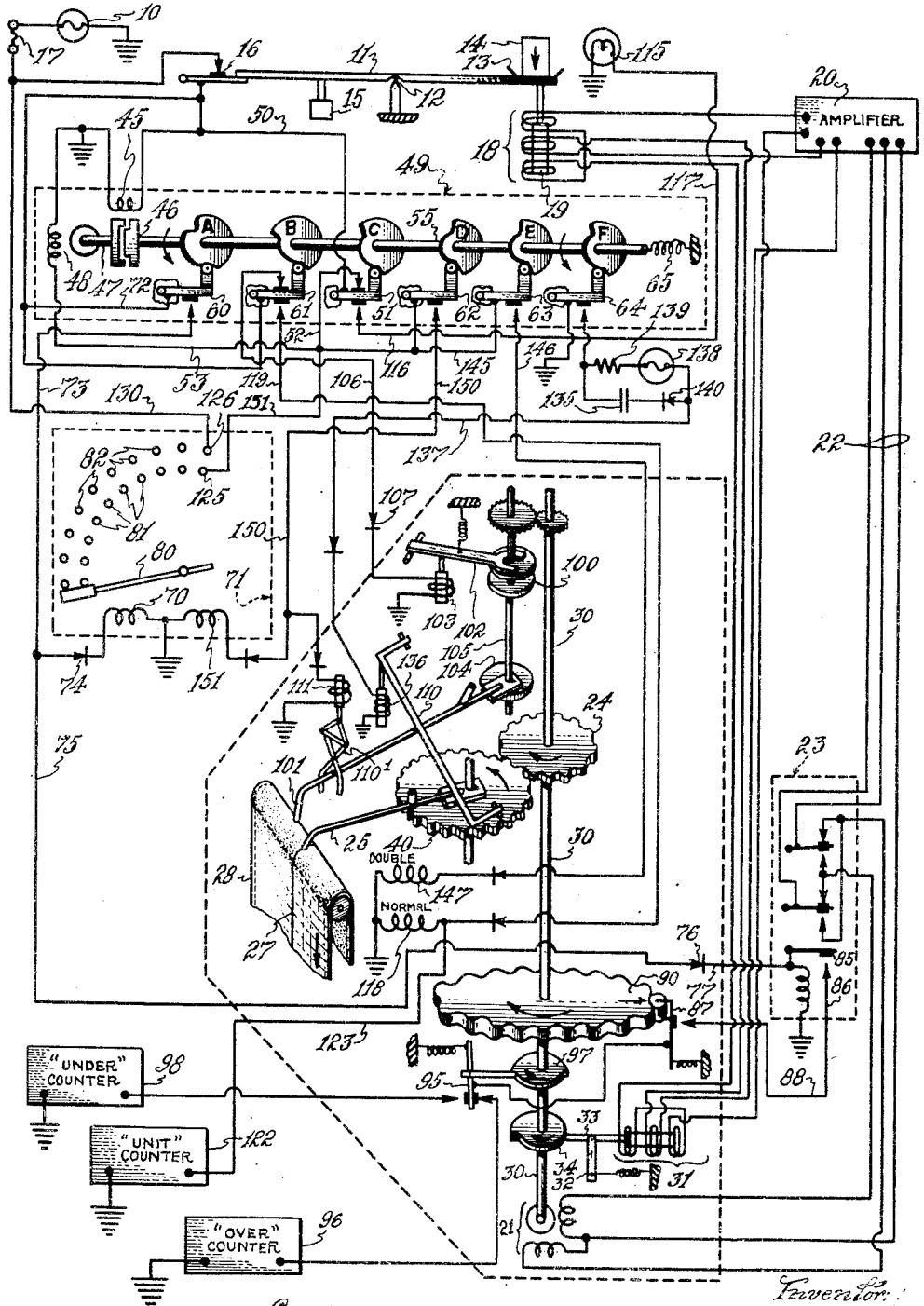

Reference is now made to Figure 1 which is a diagrammatic representation of the device with certain parts drawn in relative operating position to facilitate the description. Power for the device is supplied by a conventional A.-C. source 10. The horizontal beam 11, of the weighing scale, is fulcrumed at the point 12 and may carry a pan 13 into which the article 14 may be placed for weighing, said beam being damped as by a dash pot 15. Associated with the scale beam is a main switch 16 having a pair of normally closed contacts, one of which is connected to the line through the fuse 17, and to contact 126 on the stepper relay 71 and the other wire is connecetd to a winding 45 of a clutch 46 and also to certain switches of a sequence timer 49 as will be later described, while the transmitter 18 of a servo mechanism including the servo receiver 31 get their power from the amplifier 20 which is supplied with power same as illustrated at 10. It is here pointed out that the iron plunger 19 of the servo transmitter 18 is pivotally attached to the scale beam 11 and, therefore, is displaced with respect to the transmitter coils as the beam 11 deviates from an established balance position. When the scale is not supporting a package, such as the article 14, the beam 11 rotates in a counterclockwise direction to the point where the main switch 16 opens the circuit to the line. If the scale is pre-adjusted to establish the weight deviation of articles from a normal weight of 16 ounces, the beam 11 will assume a substantially horizontal position when the article 14 weighs exactly 16 ounces, under which condition the servo transmitter 18 is balanced. In the event the article deviates from such normal weight the servo transmitter will become unbalanced and the voltage induced in one or the other of the transmitter coils will increase. Such voltage increase is amplified by the amplifier 20 and applied to the recorder motor 21, through the wires 22 and the contacts of a power relay 23, to establish a proper rotation thereof. More specifically, if the article 14 is overweight, the servo mechanism will cause a clockwise rotation of the motor 21 and the gear 24 will drive the normal, inking, or graphing, pen 25 to the right of a center line 27 on the chart 28. The extent of the angular rotation of the main shaft 30, coupled to the recorder motor 21, depends upon the extent to which the article being weighed deviates from the normal weight of 16 ounces, as re-establishment of a new balance in the servo mechanism, as a whole, is accomplished through the servo receiver 31 which is identical to the servo transmitter 18. It will be noted that the plunger associated with the servo receiver 31 is attached to a spring-biased, pivoted arm 32, the arrangement being such that the finger 33 is maintained in sliding contact with the cam 34. In the position shown, the cam 34 occupies the position prevailing when the entire device is "at rest" that is, when not actually in operation, and under this condition the plunger of the servo receiver unit 31 is balanced relative to the coils associated therewith. Under a condition when the article 14 is overweight, and the motor 21 rotates the shaft 30 in a clockwise direction, the cam 34 moves such plunger to the right, which movement, directionally, compensates for a similar movement of the plunger of the servo transmitter associated with the scale beam.

It is now apparent that pivotal displacement of the scale beam results in a corresponding angular rotation of the main shaft 30 and a corresponding deflection of the normal pen 25, the latter being secured to the gear 40 in any suitable manner. The recorder chart 28 may be calibrated in ounces, or fractions of an ounce, so that if the article 14 is 17 ounces, the pen 25 will move one unit to the right of the chart center. If, on the other hand, the article 14 weighs only 10 ounces, the pen 25 will deflect 6 units to the left of such center line. Of course, any other relative calibration may be employed, it being borne in mind the weighing scale is counterbalanced to assume a substantially horizontal position for the normal weight of the articles to be tested and the servo mechanism, gearing, and recorder scale chart are adjusted and calibrated accordingly. In an actual device the chart range was ½–0–½ ounce, with each scale division equal to 1/100 ounce.

Having described the servo mechanism of the device in sufficient detail to convey an understanding thereof to those skilled in this art, I shall now proceed to describe the numerous other functions performed simultaneously and/or sequentially.

The main switch 16 closes its contacts whenever the scale beam 11 is deflected by placement of an article 14 thereon. Closure of the switch 16 immediately applies power to the solenoid 45 of the electro-magnetic clutch 46 inserted in the shaft 47 connected to a motor 48 of a sequence timer 49. Closure of the switch 16 simultaneously energizes the motor 48, power being applied thereto through the wire 50, the normally-closed contacts of the switch 51, and the wires 52 and 53. Energization of the motor 48, and the clutch 46, results in rotation of the timer shaft 55 that carries the six cams identified by the letters A, B, C, D, E and F cooperating with the respective switches 60, 61, 51, 62, 63, 64. These switches are provided with individual springs biasing the associated rollers into contact with the cam periphery, such spring-biased arrangements being well known in the art. Further, the timer 49 is provided with a spring 65 that returns all cams to a fixed starting position upon deenergization of the electro-magnetic clutch 46, as is also well known in the art.

Rotation of the timer shaft 55 results in a predetermined actuation of the individual switches. The operations effectuated by the closure of the individual timer switches will be described separately by reference to the specific cam letter.

*Cam A.*—This cam closes the contacts of the switch 60 which applies power to the operating solenoid 70 of the stepper relay 71 through the wires 72, 73 and the rectifier 74, and to the operating coil of the power relay 23 through the wire 75, rectifier 76 and wire 77. The specific functions performed by the stepper relay will be described hereinbelow; suffice to say for the present, that the arm 80 of this relay is ratchet controlled and establishes contact with the aligned contact points 81, 82, sequentially, each time the operating coil 70 is energized and deenergized. On the other hand, the energization of the operating coil of the power relay 23 transfers the upper two sets of contacts to reverse the potential applied to the field coils of the recorder motor 21 for purposes to be explained later. The closure of the lower contacts 85, 86, of the power relay 23, applies voltage to the back, normally-open, contact of the switch 87, through the wire 88, which switch is spring-biased to maintain the associated roller in contact with the periphery of the cam 90 attached to the main shaft 30. It will be noted the cam 90 has peripheral teeth and rotation thereof causes a periodic closure and opening of the contacts of the switch 87. The closure of the contacts of the switch 87 applies the voltage to the movable contact of the double throw switch 95 and, in the position shown, voltage is applied to energize the operating coil of the electromagnetic counter 96. It is pointed out that the cam 97, associated with the switch 95 has a peripheral contour such that the switch contacts remain in the illustrated position upon clockwise rotation of the shaft 30. Therefore, the periodic closing and opening of the contacts of the switch 87 results in a corresponding pulse-actuation of the counter 96, which is identified as the "Over" counter. Thus, if the number of teeth on the cam 90 correspond to the unit graduations on the recorder chart, an overweight deflection of the recorder pen 25 of, say, 4 units, results in four operations, or counts, on the Over counter 96.

Similarly, if the article being weighed is underweight, say, 4 units, the main shaft 30 will rotate in a counter-clockwise direction causing the cam 97 to transfer the movable contact of the switch 95 to establish closure with the back, normally-open, stationary contact. Under this condition the pulse operation of the switch 87 results in the actuation of the Under counter 98 for 4 counts. Simultaneously, the recorder pen 25 will move 4 units to the left of the chart center line. Thus, there is provided a chart record of the exact deviation of the article being weighed and a simultaneous, visual count of such deviation. It will be apparent that the number of teeth on the cam 90, to either side of the normal position indicated by the arrow a, correspond to the number of units on the chart to either side of the center, zero position. Alternatively, the ratio between such cam teeth and the chart range may be some appropriate factor such as, for example 10. Thus, if the article being weighed has an actual weight of 17 ounces and the device is set for balance at 16 ounces, the recorder pen may move to the plus (+) 1 ounce chart graduation while the Over counter 96 counts 10 units.

Inasmuch as the operating coils of the stepper relay 71 and the power relay 23 obtain power through the closure of the switch 60 associated with the cam A, these coils become deenergized upon the opening of the switch 60 after a predetermined interval of time represented by the time travel of the cam lobe. The stepper relay is, therefore, ready for the next operating impulse. However, the deenergizing of the coil of relay 23 returns the upper contacts to their normal position, shown in the drawing, whereby the unbalance voltage applied to the field coils of the main motor 21 is reversed and the servo system returns the shaft 30 to its original starting position. However, the return operation of the motor 21 and the shaft 30 produces no counts in the Over and Under counters as the power circuit thereto is broken by the lower contact on the power relay 23.

The time-interval represented by the lobe on cam A is sufficient to permit all functions to be performed by the time the contacts of the switch 60 are again opened. Specifically, the shaft 30 is permitted sufficient time to rotate approximately 180 degrees, within which period the pen 25 moves to its maximum deflection position and all counts are entered on one or the other of the counters 96, 98. It is important to note that the clutch 46 of the timer remains energized throughout the entire operating cycle controlled by the cam A, such clutch being deenergized only by opening of the main switch 16 upon removal of the article 14 from the weighing scale. Deenergization of the clutch 46 disengages the timer motor shaft 47 from the cam-carrying shaft 55, whereupon the spring 65 causes all cams to return to the original starting position. Consequently, in the event the article 14 is removed prematurely from the scale, the switch 16 is opened and the timer is reset to the zero position and simultaneously therewith all other components are placed into the normal starting position.

*Cam B.*—This cam and the associated switch 61 controls the operation of a clutch 100 which, in turn controls the deflection of the averaging pen 101. Such clutch consists of a pair of normally-spaced washers, of leather or the like, adapted to be placed into face contact by depression of the spring-biased, pivoted lever 102 upon energization of the solenoid 103. The averaging pen 101 is secured to the disc 104 attached to the shaft 105 and the gearing between such shaft and the main shaft 30 is so chosen that the averaging pen 101 moves only a predetermined fraction of the distance traversed by the normal pen 25. Thus, if the normal pen deflects one (1) unit across the chart the averaging pen will move only, say, 1/10 this distance. The movable arm of the cam-actuate switch 61 is connected to the line through the main switch 16, whereby closure of the switch 16 immediately energizes the solenoid 103 through the wire 106 and rectifier 107. Consequently, the averaging pen moves simultaneously with the normal pen. However, the relative timing of the cams A and B is such that cam B opens switch 61 just prior to the time cam A again closes switch 60 for the return cycle of the servo mechanism. By means of such arrangement the averaging pen 101 moves with the normal pen 25 only during the forward or positive movement of the latter and when the normal pen is being returned to the starting position the averaging pen remains at the point occupied when the clutch 100 became disengaged. The purpose of the averaging pen is to provide a visual indication of the average deviation from normal weight of any given number of samples tested. In the event the first sample tested is overweight one (1) ounce the averaging pen assumes a position to the right of the chart center line. If then the second sample tested is one (1) ounce underweight, the averaging pen will be deflected an equal amount in the other direction which brings the pen back to the normal zero position with reference to the chart. Although the averaging pen moves as described it, however, is not in contact with the recorder chart. Contact between this pen and the chart is effectuated by a depressor bar 110 after a predetermined number of units have been weight-tested, as will be described with reference to the operation of cam F, below. It may here be stated that upon such operation of the averaging pen it is returned to its initial zero position by means of the reset device 110′ operated by the solenoid 111.

When the cam B transfers the contacts of the switch 61 power is applied through the front contact and wire 119 to a solenoid 118, said solenoid advancing the chart paper a fixed distance in the direction indicated. Simultaneously, the Unit counter 122 is energized through the wire 123, said counter providing a count of the number of articles weight-tested on the scale.

*Cam C.*—This cam controls the operation of the switch 51 which is connected to the line by the wire 50 and closure of the main switch 16. As explained hereinabove, the switch 51 controls the operation of the timer motor 48. The timing cycle of the cam C is arranged so that the motor circuit is opened after the cams A and B have completed their normal operating cycles. When the contacts of the switch 51 are transferred by the cam lobe the power is applied through the front contact of the switch and the wires 116, 117 to a lamp 115. This lamp is disposed within the weighing scale and its energization causes a hair line to appear on a ground glass to indicate, visually, the weight deviation of the article 14 from the normal. Scales provided with such lamp-hair line indicating mechanisms are well known, one such being sold under the trade-name Shadograph. Inasmuch as the lamp 115 is energized only after completion of the full operating cycle of my device, the operator may use such lamp illumination as an indication that the article 14 may be removed from the scale.

Before proceeding to a detailed discussion of the functions controlled by the cams D, E and F, I call attention to the fact that these cams are secured firmly to the timer shaft 55 but the individual lobes and the angular extent thereof are such that the cams A, B and C operate throughout their entire cycle before either of the cams D, E and F effect a change in their respectively associated switches 62, 63, 64. When an article 14 is placed upon the scale the cams A, B and C effectuate the operations already described, one of which is the energization of the operating solenoid 70 of the stepper relay. Removal of the article from the scale results in an opening of the main switch 16, whereupon the clutch 46 disengages and the timer shaft 55 is returned to a fixed starting position by the action of the spring 65. If, now, another article is placed upon the scale the entire operating cycle of the device is repeated and, again, removal of the recorded article causes the apparatus to return to the initial starting position. Each time a weighing cycle is undertaken the arm of the stepper relay is advanced one position relative to the fixed contacts 81, 82. Thus, when the tenth weighing cycle is begun, the stepper relay arm will close the contacts 125, 126, thereby completing the power circuit from the source 10 to various components. One such component is the timer motor 48, power being furnished thereto by the wire 130, stepper relay contacts 125, 126, the wires 131 and 53. Thus, the switch 51, associated with the cam C, loses control of the timer motor and such motor runs so long as the stepper relay contacts 125, 126 remain connected by the rotary arm 80. The main switch 16 being closed (as otherwise the stepper relay arm would not have advanced to connect the contacts 125, 126) the clutch 46 is energized, the timer shaft 55 continues to rotate and the individual cams D, E, F cause the following specific operations, it being again pointed out the cams A, B and C have completed their individual operating cycles by the time the cams D, E, F operate the associated switches.

*Cam F.*—This cam eventually closes the switch 64, thereby connecting the condenser 135 in circuit with the solenoid 136 through the wire 137. The condenser is connected to an A.-C. source 138 through a resistor 139 and rectifier 140, whereby it receives a charge during the relatively long time interval between operations of the switch 64 by the cam F. When connected to the solenoid 136 a heavy impulse discharge current causes the solenoid to operate the depressor bar 110 which brings the averaging pen 101 into momentary contact with the recorder chart. The result is the placement of a dot on the chart at the point occupied by the pen on the tenth weighing cycle.

*Cam E.*—Shortly after the closure of switch 64, the cam E closes its associated switch 63 completing the power circuit from the source 10 to the front contact of the switch thru the wire 145, but through the stepper relay contacts 125, 126. Closure of the switch 63 applies power to the wire 146 thereby energizing the solenoid 147 associated with the chart drive. Through means of appropriate mechanism, not shown, the energization of the solenoid 147 advances the recorder chart a distance somewhat greater than that effectuated by the normal chart-drive solenoid 118. This provides a distinguishing feature which makes self apparent to the observer the point at which the averaging pen 101 has been placed into contact with the chart.

*Cam D.*—After the cams E and F have completed the above described operations, the cam D closes the associated switch 62 whereby power is applied to the wire 150 connected to the front contact of the switch. The wire 150 connects the reset coil 151 of the stepper relay and the solenoid 111 of the averaging pen-reset device 111 and, therefore, closure of the cam-actuated switch 62 energizes both these devices. The reset coil 151 disengages the ratchet associated with the rotary arm 80 of the stepper relay whereupon such arm returns to its initial starting position, shown in the drawing. This opens the circuit across the stepper relay contacts 125, 126 removing power from the cam-operated switches 62, 63 and opening the circuit to the timer motor 48. Even though the motor ceases to rotate the energized clutch 46 retains the cams in the final position until the article 14 is removed from the scale to open the main switch 16. The energization of the solenoid 111 operates a mechanical mechanism 110′ that returns the averaging pointer 101 to the zero-chart position, such mechanism being described in detail hereinbelow.

Having now given a detailed description of the individual components, their relative cooperation and timing sequence it may be well to go through several actual weighing cycles to summarize the functions of the device from the standpoint of the user. For this purpose reference is made to Figures 2 to 19 which are more or less pictorial representations of individual functions related to various weights placed upon the weighing scale. Although many of the individual parts of my device are specifically identified in these figures such parts are also referenced by the corresponding numerals shown in Figure 1 to facilitate an overall understanding of the device.

Reference is now made specifically to Figure 2, which represents the starting, or at rest, position of the device. The Overweight, Underweight and Unit counters, 96, 98 and 122, respectively, show zero counts, the scale pan 13 is empty, the normal or inking pen 25 and the averaging pen 101 are aligned with the center of the recorder chart 28, and the scale lamp 115 is out. The heavy dotted line on the scale machine represents the average or normal weight of the articles to be weight-tested by this particular device, that is, the beam 11, Figure 1, of the scale is substantially horizontal when the scale pan coincides with such "correct weight" position. The scale beam is associated with the "magnetic coupling" which represents the transmitter 18 of the servo mechanism. As described with reference to Figure 1, the electrical energization and deenergization of the individual components is effected automatically upon clockwise rotation of the horizontal scale beam. In the interest of clarity, however, such electrical energization and deenergization is represented by the position of the manually-operable lever 160 adapted to close a set of switches 161. In fact, the device may be of such manual-operative type without in any way altering the basic operations or functions.

If, now, the article, or weight, 162 is placed upon the scale pan, and such article is exactly of correct weight, the scale pan will deflect to the position shown in Figure 3. The electrical circuits are closed by rotating the lever 160, as shown. Inasmuch as the article is of exact weight, the two pens do not deflect from their normal, zero position and no counts are registered on the over and under counters. However, after the device has completed its operating cycle, the unit counter registers 1 count, the chart advances a fixed distance, and the lamp 115 becomes energized, thereby providing a reading on the graduated scale 163 and serving as an indication to the operator that the article may be removed from the scale.

Figure 4 illustrates the completion of such first weighing cycle, it being pointed out that the normal pen 25, which is always in contact with the chart paper, has drawn a line 165 on the chart, the length of such line being determined by the extent of the chart movement.

If, now, a heavier article 166 is placed upon the scale pan the latter deflects below the "correct weight" reference position, as shown in Figure 5. Thus, when the electrical circuits are closed by the manually-operable switch, the following operations are performed:

1. The overweight counter registers 1 count, it being clear that the article 166 weighs 1 ounce (or unit) more than normal weight;
2. The inking pen deflects to the right of the zero position drawing the arcuate line 167;
3. The averaging pen moves in the same direction one tenth the distance of that traveled by the inking pen, but, as the averaging pen is not in contact with the chart paper, no record is made by such movement of the pen;
4. The unit counter registers an addition count, indicating two samples have been tested thus far;
5. The chart paper moves downwardly, causing the inking pen to draw a vertical line 168, as shown in Figure 6.
6. The inking pen is returned to its zero position thereby drawing a second arcuate line 169;
7. The lamp 115 becomes energized.

Figure 6 illustrates the condition of the apparatus after the completion of the second weighing cycle and after the article 166 has been removed from the scale pan. It will be noted that the substantially rectangular record drawn on the recorder chart illustrates the deviation of the article 166 from normal and in this case the vertical line 168 coincides with the chart marking of, say +1 ounce. It will also be noted that the averaging pen remains in its deflected position.

Reference is now made to Figure 7 wherein a weight 170, being 2 units (or ounces) overweight, is placed upon the scale pan. This third weighing cycle causes the following operations to take place:

1. The overweight counter registers an additional two counts making the total 3;
2. The inking pen moves two units to the right of the zero chart position drawing the line 172;
3. The averaging pen moves further from its last position (Figure 6) such additional movement being 1/10 of the total present movement of the inking pen. (It may be well to here point out that if the article 170 was only 1 unit overweight the line 172 (Figure 7) drawn by the inking pen would have the same horizontal length as the line 167 of Figure 6);
4. The unit counter registers 3 counts;
5. The chart paper advances a fixed distance;
6. The inking pen returns to its zero position;
7. The scale lamp becomes illuminated.

The condition of the apparatus, upon removal of the article 170 is shown in Figure 8. It will be noted the chart record includes three vertical lines corresponding to the completion of three weighing cycles and, of course, to the counts on the unit counter.

In Figure 9, a fourth article 175 is placed upon the scale pan, such article being of the exact normal weight. Consequently, the unit counter only is activated to indicate 4 counts, the averaging and inking pens do not deflect from the positions occupied in Figure 8, but the advancement of the chart paper causes the inking pen to draw another vertical line.

Figures 11 and 12 illustrate a fifth weighing cycle wherein the fifth article 176 is underweight by 2 units. In this case the following operations take place:

1. The underweight counter registers two (2) counts;
2. The inking pen draws a line 2 units to the left of the zero chart position;
3. The averaging pen moves to the left a distance equal to 1/10 the distance of travel of the inking pen;
4. The chart paper advances;
5. The inking pen returns to its zero position;
6. The unit counter registers another count, totalling 5;
7. The scale lamp becomes energized.

In Figure 13, an article 177, being 3 units overweight is placed on the scale pan. This adds 3 counts to the overweight counter (making the total 6), one count to the unit counter (making the total 6), causes the inking pen to move to the right of the zero chart position a distance of 3 chart graduations, and causes the averaging pen to move further to the right.

It should now be clear that the averaging pen follows the movements of the inking pen but at a travel ratio of 1 to 10. Thus, upon the completion of 10 weighing cycles the final position of the averaging pen, with respect to the chart graduations, will indicate the average deviation from normal weight, of the ten articles tested.

Figures 14 and 15 illustrate the removal of the heavy article 177 and the placement of article 178 on the scale pan, such article being substantially 1 unit overweight, and such article constituting the seventh unit tested.

We shall now assume 9 weighing cycles have been completed and pass to the tenth cycle as illustrated in Figure 17 wherein the article 180 constitutes the tenth article placed upon the scale pan. As the article is 3 units overweight the overweight counter registers an additional 3 counts, the unit counter registers 10 counts, the inking pen draws the usual chart line to the +3 unit scale graduation on the recorder chart, and the averaging pen moves further to the right. However, the recorder chart now advances a greater distance than for the individual previous cycles causing the inking pen to draw a relatively long vertical line 181 as shown in Figure 18. At the same time the mechanism associated with the averaging pen (see Figure 1 and specifically the actions controlled by the solenoids 111 and 136) cause the averaging pen to contact the chart paper placing a dot thereon, after which the averaging pen is returned to the zero, center, chart position ready for the next ten weighing cycles. Thus, at the end of each ten weighing cycles there is provided a significant record indicating the precise average variation from normal of the previous ten articles weight-tested and the apparatus is ready for the continuation of such testing.

Figure 19 illustrates the eleventh test cycle wherein the article 181 happens to be of normal weight. Whether the three counters continue to add counts to the previous totals or are reset to zero at the end of the tenth cycle is a matter of choice.

Figure 20:
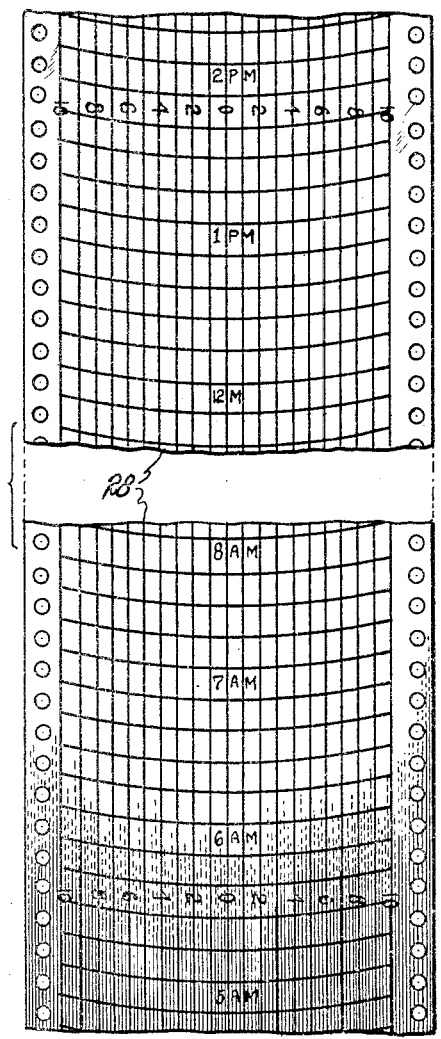
Figures 20 to 22 illustrate a representative recorder chart upon which a permanent record is made of the deviation, from normal, of an article under test.
Figure 22:
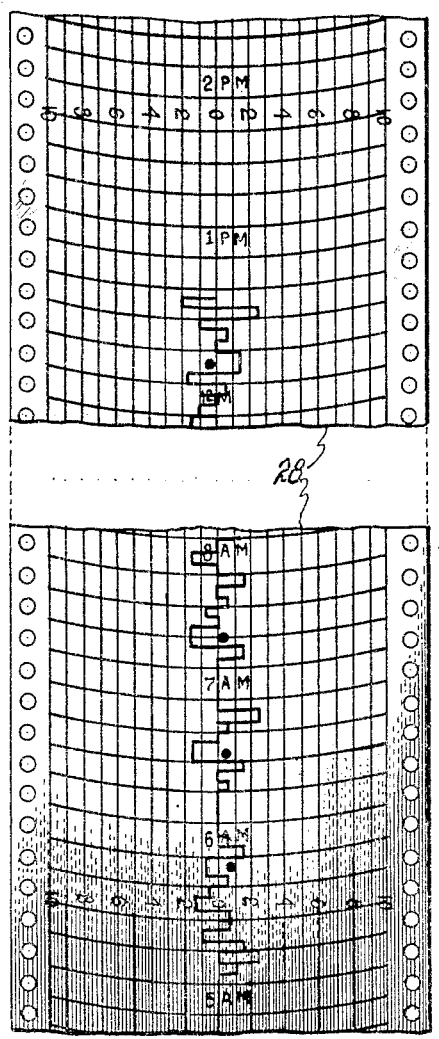
Figure 21:
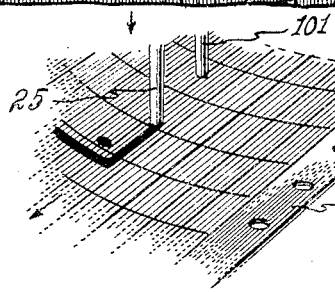

Reference is now made to Figures 20–22 illustrating a sample chart record. As shown in Figure 20 the chart 28 has vertical graduations to either side of the zero-center position. Such chart graduations may be in pounds, ounces or fractions thereof, to suit the particular requirement for which the apparatus is designed. Figure 21 illustrates the continuous line drawn by the normal or inking pen 25 and the dot 185 placed upon the chart by the averaging pen 101 every tenth cycle of operation. Figure 22 illustrates a chart record for numerous weighing cycles, it being noted every tenth cycle is indicated by the extra long chart movement and the dot formed by the averaging pen.

The entire apparatus is housed in a practical cabinet designed to facilitate adjustment and/or servicing of the various parts. As shown in Figure 23, the cabinet 190 is provided with a flat top 191 and a main panel 192 is hinged to the cabinet in such manner that it forms the cabinet front and may be swung open to permit access to the cabinet interior housing the numerous electrical and electro-mechanical components. The three counters, namely, Over counter 96, Under counter 98 and Unit counter 122 are mounted on the front of the panel 192 with the faces tilted upward for easy reading by a person in the standing position. Positioned over the counters is the recorder mechanism (which is obvious from the drawing) including the inking pen 25, and the averaging pen 101, the latter being placed into contact with the recorder chart upon downward depression of the depressor bar 110. The two bottles 194 and 195 are adjustably supported on the panel 192 and contain the ink which is fed to the two pens through individual tubings 196, 197. By adjusting the height of these bottles relative to the associated pen point the rate of ink flow may be regulated.

Figure 24 is a plan view of the cabinet top 191 upon which the weighing scale 199 is supported, such scale having a pan 200 into which the article to be weight-tested is placed. A viewing glass 201 is inserted into the cabinet top to permit the operator to observe the operation of the recording apparatus.

Figure 25 is a plan view illustrating a gear 202, corresponding to the toothed cam 90 shown in Figure 1. Such gear is attached rigidly to the main shaft 30 and rotation thereof causes an on-off operation of the switch 87 that controls the energization of the over and under counters, as already described. The cam 97 and the associated double-throw switch 95 determines which of these counters is connected into the circuit, as is clear from the mechanical arrangement shown in Figure 26.

Figure 27 illustrates the rear of the panel 192. The main shaft 30, extending substantially the entire height of the panel, is driven by the motor 21. The position of the gear 202 and the cam 97, both just described with reference to Figures 25 and 26, is also shown. Disposed at the top end of the main shaft 30 is a gear housing 205, carried by the panel 192 and the central portion of the panel is taken up by a suitable power pack, rectifiers, control switches, etc. It is deemed sufficient, for present purposes, to state that the inking pen of the recorder is mechanically attached to a gear engaged by the gear 206 of the lower gear train, and that the averaging pen is attached to the disc 207 carrying the leather washer 208 that is adapted for face contact with a similar washer 209 rotatable with the main shaft 30. Ink is fed to the pens by the individual tubes 196 and 197 terminating in the ink bottles 195 and 196 shown in Figure 23.

The two leather washers 208 and 209 constitute a clutch for driving the averaging pen on the forward half of the weighing cycle, as described with reference to Figure 1. Operation of the clutch is controlled by the solenoid 103 having a plunger pivotally connected to the crank arm 102. It is clear that energization of the solenoid places the two leather washers into face contact whereby the averaging pen deflects over the recorder chart. The solenoid 111 actuates the averaging pen resetting mechanism as will be described in more detail hereinbelow.

Reference is now made to Figures 28–32. Figure 28 is a plan view showing the construction of the averaging pen mounting arrangement and Figure 29 is a similar view of the inking pen. It will be noted the tubular averaging pen 101 is secured to the disc 215 and the inking pen 25 is secured to the arm 216 that is, in turn, pivotally secured to the arm 217. Referring now to Figure 30, which is a side view of the gear housing 205 shown at the top of Figure 27, the disc 215 of the averaging pen 101 is secured to the leather washer 208 and rotates therewith when face contact is established with the washer 209. Note that the free tip of the averaging pen 101 is spaced from the recorder chart 28. On the other hand, the arm 217 carrying the inking pen 25 is attached to a shaft rotatable, upon rotation of the main shaft 30, through the gear train in the lower part of the gear housing 205.

Figure 31 is a plan view of the sub-assembly shown in Figure 30, but with the top plate of the gear housing 205 and the upper gear train removed. This view shows, clearly, the crank arm 102 that causes the engagement and disengagement of the leather disc clutch, of the averaging pen, upon energization and deenergization of the solenoid 103, and the tubes 196 and 197 connecting the pens to the ink bottles 194 and 195, respectively. There is also shown the solenoid 111 which resets the averaging pen to the zero position after the completion of ten weighing cycles.

Reference is made to Figure 32 for a description of the averaging pen reset mechanism. The plunger 220, of the solenoid 111, is pivotally attached to a pair of arms 221. Each of these arms is connected, pivotally, to a pair of fingers 222 which, in turn, are pivotally connected together at the point 223. It is apparent that when the solenoid is energized the inward movement of the plunger causes the fingers 222 to come together. The upwardly-extending pin 225 is fixed in position relative to the plate 226, whereas the similar pin 227 is secured in the hole 228 in the disc 215 carrying the averaging pen 101, see Figure 28. Thus, the pin 227 will rotate with the disc of the averaging pen. However, and regardless of the actual position of the pin 227 at the completion of the tenth weighing cycle, energization of the solenoid 111 and the resulting closure of the fingers 222 returns the pin to its original position. The spacing between the inner faces of the fingers 222, when the solenoid 111 is energized, will, of course, be equal to the diameter of the pins 225, 227 and such pins will form a straight line with the pivot joint 223, of the reset device, and the shaft 230 to which the disc 228 of the averaging pen is attached. There is, therefore, a positive arrangement for returning the averaging pen 101 to the zero chart position, as shown in Figure 32.

Having now described my invention in accordance with the patent statutes, various changes and variations in the individual components, and their relative co-action will suggest themselves to those skilled in this art. Such variations and changes may be made without departing from the spirit and scope of the invention as set forth in the following claims.

I claim:

1. An instrument for the purpose described comprising a pivoted beam occupying a relatively fixed position when an article of normal weight is placed thereon, power control means including a main shaft, said control means being brought into operation by movement of said beam, a servo system interconnected between the said beam and the power control means for moving said means in either of two directions and responsive to movements of said beam, a main line switch positioned to be directly operated by said beam depending on the article weight at the servo end of the beam, a recorder having a zero center chart, an inking pen in contact with the chart and having a zero position coinciding with the zero chart position, an averaging pen normally spaced from the chart, said power means being operative to deflect the inking pen to either side of the zero position in response to deflections of the scale beam to either side of its relatively fixed position, means for deflecting the averaging pen a predetermined percentage of the movement of the inking pen and only during the out stroke of said inking pen, means effective at a predetermined time to advance the recorder chart a fixed distance and means for reversing the power so as to return the inking pen to the zero position and timing means controlling the operation of the reversing power means a predetermined time interval after operation of the initial action of the power means.

2. The invention as recited in claim 1, wherein the reversible power means comprises said main shaft connected to a driving motor and said driving motor is controlled by said servo system of the balanced type, and including means coupled to the scale beam to unbalance the servo system when the said beam deflects from its relatively fixed position.

3. The invention as recited in claim 1, further defined in that the inking pen and averaging pen are operated by said main shaft having interconnecting means to said pens and wherein the means deflecting the averaging pen comprises an electro-magnetic clutch interposed between the said pen and the main shaft, and timing means energizing said electro-magnetic clutch when the inking pen is deflected in the forward direction.

4. The invention as recited in claim 1, further defined in that the inking pen and averaging pen are operated by said main shaft having interconnecting means to said pens and wherein the means deflecting the averaging pen comprises a disc secured to the averaging pen, a first resilient washer secured to the said disc, a second resilient washer spaced from the said first washer, gearing connecting the second washer to the main shaft, a pivoted crank arm coupled to the said second washer, a solenoid having a plunger pivotally connected to the crank-arm, and means energizing the solenoid at a predetermined time, said plunger deflecting the crank arm to move the second washer into face contact with said first washer.

5. The invention as recited in claim 1, including means moving the averaging pen into contact with the chart after a predetermined number of deflections of said inking pen.

6. The invention as recited in claim 1, further defined in that means are provided for moving the averaging pen into contact with the chart after a predetermined number of deflections of said inking pen and still further defined in that the means moving the averaging pen into contact with the chart comprises a pivoted depressor bar disposed over the averaging pen, a solenoid having a plunger pivotally attached to the depressor bar, and means energizing the said solenoid upon a predetermined number of deflections of the inking pen.

7. The invention as recited in claim 1, further defined in that means are provided for moving the averaging pen into contact with the chart after a predetermined number of deflections of said inking pen and still further defined in that means are provided for resetting the averaging pen to the zero chart position after a predetermined number of deflections of the inking pen.

8. The invention as recited in claim 1 in combination with electro-magnetic counters, means energizing one such counter each time the scale beam is deflected from its relatively fixed position, means energizing a second such counter when the scale beam deflects beyond its relatively fixed position, and means energizing a third counter when the scale beam deflection is less than its relatively fixed position.

9. Automatic weighing apparatus comprising a pivoted beam upon which the article to be weight-tested is placed, said beam occupying a tilted position when unloaded and a substantially horizontal position when loaded with an article of normal weight, said apparatus including for rotational operation a motor driven timer having a plurality of timing cams and associated switches, an electro-magnetic clutch controlling the rotation of said cams by the timer motor, a switch for applying power to said clutch when the pivoted beam rotates from its initial tilted position, a recorder having a zero center chart, an inking pen in contact with the recorder chart, an averaging pen normally spaced from said chart, a main drive shaft, a gear train connecting the inking pen to the main drive shaft, a friction clutch connecting the averaging pen to the main shaft, a servo system having a transmitter associated with the said pivoted beam and a follower associated with a cam attached at the said drive shaft, a drive motor connected to the main drive shaft, means impressing upon said drive motor a current having a direction and magnitude corresponding to the deviation from horizontal of said pivoted beam, a counter actuated by one of the timing cams and associated switch, a stepper relay actuated by another of the timing cams and associated switch, a chart advancing solenoid actuated by another of said timing cams and associated switch, means controlled by a timer cam and associated switch to reverse the current applied to the said drive motor, and means for deenergizing the timing motor after a predetermined time interval.

10. The invention as recited in claim 9, including means for energizing the timing motor when the stepper relay has been actuated a predetermined number of times, an electro-magnetic depressor bar bringing the averaging pen into contact with the recorder chart, said bar actuated by a timing cam and switch, an electro-magnetic mechanism resetting the averaging pen to the zero chart position, said mechanism actuated by a timing cam and associated switch, and a switch controlled by a timing cam to deenergize the timing motor upon completion of the listed operations.

11. The invention as recited in claim 9 and including an overweight counter and an underweight counter, and means selectively actuating one of said last menttioned counters upon rotation of the main drive shaft.

12. The invention as recited in claim 9, further defined in that an overweight counter and an underweight counter are operatively connected to said main shaft with means for selectively actuating one of said last mentioned counters upon rotation of the main drive shaft, said means for selectively actuating one of the counters comprises a cam secured to the main shaft, a single pole-double throw switch having a movable contact controlled by said cam, circuit elements connecting each said counter to one of the stationary contacts of said switch, a toothed wheel secured to the main shaft, a switch operated by such teeth to periodically open and close a circuit as the wheel rotates, said switch contacts being connected between a source of power and the movable contact of the double throw switch.

13. An apparatus for the purpose described including differentiating means responsive to slight weight variations in materials applied to said means, a plurality of cams timingly mounted on a shaft for simultaneous rotation therewith and a motor drive therefor responsive to said differentiating means, a switch operatively connected to each of said cams and each switch controlled by its cam to assist in actuating devices utilized in registering said weight variations, a main drive shaft for the apparatus and a power motor operatively connected to said shaft, electric servo controlled means including a transmitter operatively connected between said differentiating means and said power motor for starting the motor and operating the disc shaft according to said variations in material and causing the same to be recorded on suitable recording means including over and under counters, suitable cams connected to said disc shaft, one of said cams controlling the movement of said shaft, the other cams acting to control by suitably arranged switches the energy going to said over and under counters.

14. In an apparatus of the class set forth in claim 13 further defined in that the recording means includes a pivotally mounted pen deflectable over a chart and friction means retaining the pen in the deflected position, a pen resetting mechanism comprising a first pin fixed in position relative to the recorder case, a second pin rotatable with the pen, a pair of pivotally mounted fingers, a plunger pivotally connected to a pair of diverging members, pivotal connections between each of the diverging members of the fingers, spring means biasing the said fingers out of the normal path of travel of the said second pin, and an electrical coil surrounding the plunger, the arrangement being such that movement of the plunger upon energization of the coil results in a closing of the said fingers to bring the two pins into alignment with the pivotal connection of said fingers.

15. An apparatus as set forth in claim 13 further defined in that said elements are self-decycling having a time cycle of less than 10 seconds.

16. An apparatus as set forth in claim 13 further defined in that should said differentiating operation be prematurely interrupted the apparatus will automatically return to initial starting position.

17. An apparatus as set forth in claim 13 further defined in that said servo-means acts to turn the main drive shaft in different directions depending on whether the material being measured is over or under a fixed standard as and for the purpose described.

18. An apparatus as set forth in claim 13 further defined in that said cams are connected to an operating motor by an electric clutch under control of the material differentiating means.

References Cited in the file of this patent

UNITED STATES PATENTS

| | | |
|---|---|---|
| 1,463,770 | Bates | July 31, 1923 |
| 1,629,221 | MacNutt | May 17, 1927 |
| 1,851,703 | Hamilton | Mar. 29, 1932 |
| 1,996,189 | Biro | Apr. 2, 1935 |
| 2,040,073 | Brendel | May 12, 1936 |
| 2,062,915 | Lamb | Dec. 1, 1936 |
| 2,101,452 | Rauch | Dec. 7, 1937 |
| 2,116,086 | Van Berkel | May 3, 1938 |
| 2,147,668 | Pfeiffer | Feb. 21, 1939 |
| 2,149,475 | Sykes et al. | Mar. 7, 1939 |
| 2,167,517 | Korber | July 25, 1939 |
| 2,339,289 | Olken | Jan. 18, 1944 |
| 2,351,319 | Chase et al. | June 13, 1944 |
| 2,392,023 | Cooper | Jan. 1, 1946 |
| 2,452,587 | McCoy | Nov. 2, 1948 |
| 2,471,368 | Ekstrom et al. | May 24, 1949 |
| 2,543,794 | Mayer | Mar. 6, 1951 |